United States Patent
Shin et al.

Patent Number: 5,929,501
Date of Patent: Jul. 27, 1999

[54] LIQUID CRYSTAL DISPLAY DEVICE WITH STORAGE CAPACITOR AND METHOD OF FABRICATING

[75] Inventors: Jae-Hak Shin, Ich'on; Hae-Sung Park, Seoul, both of Rep. of Korea

[73] Assignee: Hyundai Electronics Industries Co., Ltd., Kyoungki-do, Rep. of Korea

[21] Appl. No.: 08/754,295

[22] Filed: Nov. 20, 1996

[30] Foreign Application Priority Data

Nov. 20, 1995 [KR] Rep. of Korea ................ 95-42298

[51] Int. Cl.⁶ .................... H01L 31/00; H01L 31/062; H01L 31/113
[52] U.S. Cl. .................... 257/448; 257/291; 257/294; 257/444; 257/447
[58] Field of Search .................... 257/291, 294, 257/443, 444, 447, 448, 449

[56] References Cited

U.S. PATENT DOCUMENTS

| | | |
|---|---|---|
| 4,687,298 | 8/1987 | Aoki et al. |
| 5,295,005 | 3/1994 | Nishida et al. ............... 359/41 |
| 5,327,001 | 7/1994 | Wakai et al. ............... 257/350 |
| 5,377,031 | 12/1994 | Vu et al. ............... 359/59 |
| 5,500,750 | 3/1996 | Kanbe et al. ............... 359/58 |
| 5,508,591 | 4/1996 | Kanemori et al. ............... 315/169.3 |
| 5,605,847 | 2/1997 | Zhang ............... 437/24 |

FOREIGN PATENT DOCUMENTS

| | | |
|---|---|---|
| 0595363 | 5/1994 | European Pat. Off. |
| 0660160 | 6/1995 | European Pat. Off. |
| 0733929 | 9/1996 | European Pat. Off. |
| 5249492 | 9/1993 | Japan. |
| 5281574 | 10/1993 | Japan. |
| 7230104 | 8/1995 | Japan. |
| 2259392 | 3/1993 | United Kingdom. |

*Primary Examiner*—Mahshid Saadat
*Assistant Examiner*—Allan R. Wilson
*Attorney, Agent, or Firm*—Ware, Fressola, Van Der Sluys & Adolphson LLP

[57] ABSTRACT

A liquid crystal display device that includes a storage capacitor having a capacitor electrode for storing voltage applied to a pixel electrode for a constant period of time, is disclosed. The device includes: a plurality of data lines arranged in parallel over an insulation glass substrate; a plurality of gate lines arranged in parallel over the insulation glass, gate lines being crossed with the data lines to define a plurality of pixel regions; a plurality of the pixel electrodes formed at the pixel regions, respectively; a plurality of TFTs formed at the cross points of the data lines and the gate lines, and each TFT is connected to each data line and each pixel electrode, respectively; and a plurality of opaque layers formed on the insulation glass substrate 40, each light shielding layer consisting of a body and a plurality of protrusions, and the body being elongated along each data line and overlapped with the portions of pixel electrodes and each protrusion protruded from the body to each TFT.

6 Claims, 2 Drawing Sheets ns,501

LIQUID CRYSTAL DISPLAY DEVICE WITH STORAGE CAPACITOR AND METHOD OF FABRICATING

BACKGROUND OF THE INVENTION

The present invention relates to a liquid crystal display device, and more particularly to a thin film transistor—liquid crystal display ("TFT-LCD") device using a light-shielding layer as a capacitor electrode for storing voltage applied to a pixel electrode.

In general, a stagger TFT and an inverted stagger TFT can be used as a switching device in a LCD. The stagger TFT has an advantage in that low resistance of a gate wiring is possible and the number of masks in fabrication process is reduced as compared with the inverted stagger TFT. However, a separate light-shielding layer is needed for preventing degradation of the TFT from backlight.

In active matrix LCD using a TFT array as a switching device for applying a constant signal voltage to a pixel electrode, of fabrication methods of the TFT array having a stagger structure, the technique using three mask patterns which include a mask pattern for a gate line, a mask pattern for a data line and a mask pattern for a light-shielding layer has been practically used.

A layout of mask patterns used in fabricating a conventional TFT-LCD is shown in FIG.1. As shown in this figure, there is a mask pattern 1 for a light-shielding layer, mask pattern 2 for a data line and pixel electrode, and a mask pattern 3 for a gate line, respectively. The mask pattern 2 consists of a pattern 2a for a data line and a pattern 2b for a pixel electrode.

Referring to FIG. 2, a simplified sectional structure of a stagger TFT-LCD which is fabricated by using conventional mask patterns of FIG. 1 is shown. First, an opaque metal layer, for example Cr or Al, is formed to a thickness of about 1000 Å on a transparent insulation substrate 10 and then etched by using the mask pattern 1 for a light shield layer of FIG.1 to form a light-shielding layer 11.

Over the insulation substrate 10 including the light shielding layer 11, an intermediate insulation film 12 is formed. An ITO (indium tin oxide) of a transparent conduction film is formed to a thickness of about 1000 Å on the intermediate insulation film 12 and then etched by using the mask pattern 2 for a data line and pixel electrode to form a data line 13 and a pixel electrode 14. At this time, source/drain electrodes of a TFT (not shown) are formed in the date line and pixel electrode formation step.

Over the glass substrate 10, an amorphous Si layer, an insulation film such as a silicon oxide film, and an Al layer for a gate electrode are formed, in turn to a thickness of about 1000 Å, 3000 Å, and 5000 Å, respectively. They are then etched using the mask pattern 3 for a gate line, to form a semiconductor layer 15, a gate insulation film 16 and a gate electrode 17, thereby forming a stagger TFT-LCD.

According to the conventional method, a stagger TFT-LCD is fabricated with a simplified process using three mask pattern for cost reduction purposes. However, the TFT-LCD does not maintain the voltage applied to a pixel electrode through the TFT for a constant period of time, thereby causing problems such as a residual image.

In order to solve the problem of a residual image, a TFT-LCD has been proposed having a storage capacitor which maintains the voltage applied to a pixel electrode through the TFT for a constant period of time. However, since the process using three mask patterns or more should be carried out in order to fabricate the TFT-LCD adapting the storage capacitor, it has disadvantage in that the process is complicated and the cost of fabrication is high.

SUMMARY OF THE INVENTION

An object of the present invention is to provide a TFT-LCD using a light-shielding layer as a storage capacitor electrode.

Another object of the present invention is to provide a method of fabricating a TFT-LCD having a storage capacitor with a simplified process using three mask patterns.

Another object of the present invention is to provide a TFT-LCD and a method of fabricating the same to solve a problem of a residual image.

In accordance with one embodiment, there is provided a liquid crystal display device that includes a storage capacitor having a capacitor electrode for storing voltage applied to a pixel electrode for a constant period of time, comprising: a plurality of data lines arranged in parallel over an insulation substrate; a plurality of gate lines arranged in parallel over the insulation substrate, gate lines being crossed with the data lines to define a plurality of pixel regions; a plurality of the pixel electrodes formed at the pixel regions, respectively; a plurality of TFTs formed at the cross points of the data lines and the gate lines, each TFT being connected to each data line and each pixel electrode, respectively; and a plurality of opaque layers formed on the insulation substrate, each opaque layer consisting of a body and a plurality of protrusions, and the body being elongated along each data line with being overlapped with the portions of pixel electrodes and each protrusion protruded from the body to each TFT.

In addition, there is provided a method of fabricating a liquid crystal display device that includes a storage capacitor having a capacitor electrode for storing voltage applied to a pixel electrode for a constant period of time, comprising the steps of: forming a light-shielding layer consisting of a body elongated over an insulation substrate and protrusion protruded from the body; forming an intermediate insulation film over the insulation substrate including the light-shielding layer; forming a data line elongated along the body of a light-shielding layer and the pixel electrode being overlapped with the portion of the of light-shielding layer; and forming a semiconductor layer, a gate insulation film and a gate line on the intermediate insulation film over the protrusion.

BRIEF DESCRIPTION OF THE DRAWINGS

The objects and feature of the invention may be better understood with reference to the following detailed description, appended claims, and attached drawings wherein:

DETAILED DESCRIPTION OF THE INVENTION

Figure 1:
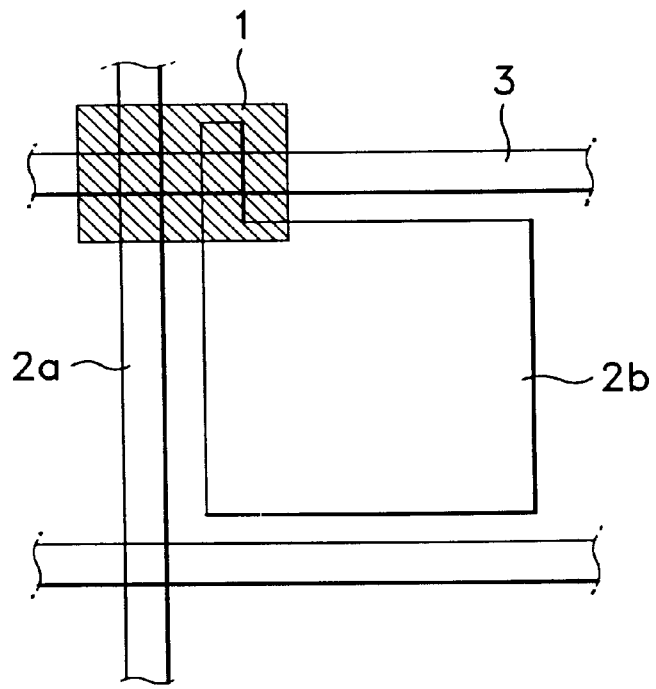
FIG. 1 is a layout of mask patterns used in fabricating a conventional TFT-LCD.
Figure 2:
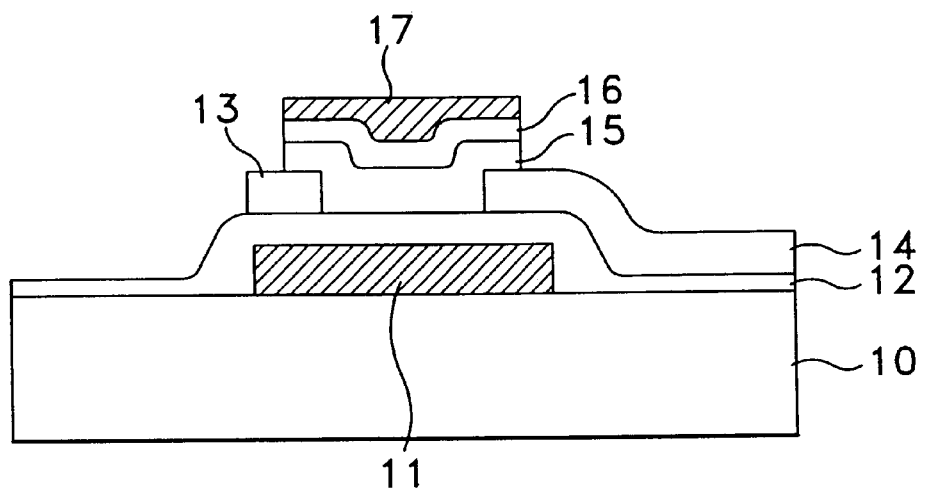
FIG. 2 is a simplified sectional view of a conventional TFT-LCD which is fabricated by using mask patter of FIG. 1.
Figure 3:
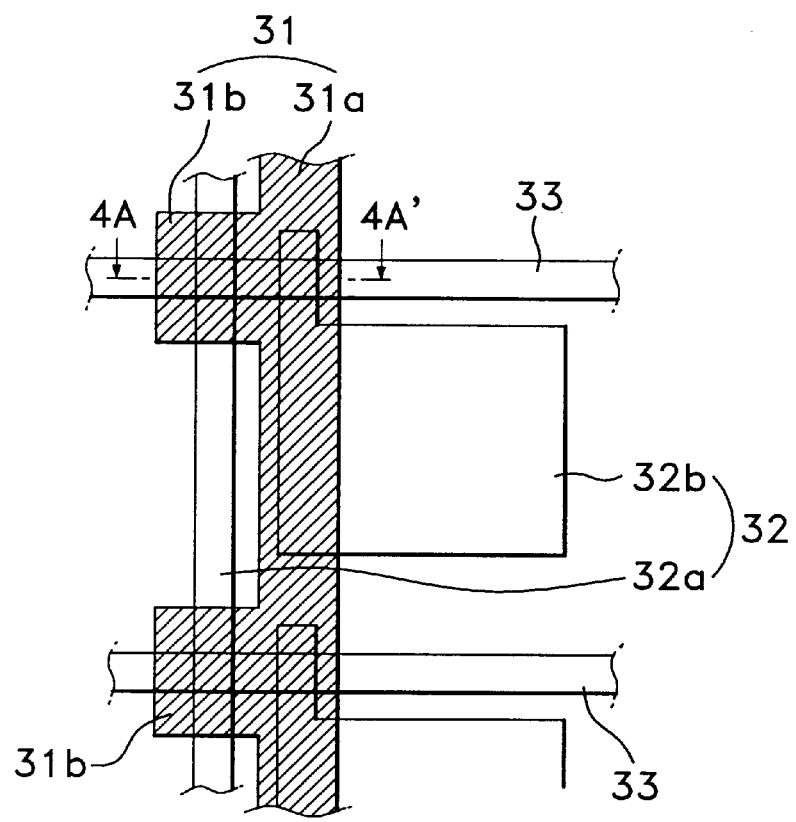
FIG. 3 is a layout of mask patterns used in fabricating a TFT-LCD adapting a storage capacitor in accordance with the present invention.

Referring to FIG. 3, in accordance with an embodiment of the present invention, there is provided three mask patterns, a first mask pattern 31 for a light-shielding layer, a second mask pattern 32 for a data line and pixel electrode, and a third mask pattern 33 for a gate line, which are used in fabricating a TFT-LCD having a storage capacitor.

The second mask 32 consists of a data line pattern 32a which is elongated in a column and a pixel electrode pattern 32b which is arranged at the pixel region which is defined by the third mask pattern 33 and data line pattern 32a. The third mask pattern 33 is elongated in a row to be crossed with the data line pattern 32a of the second mask pattern 32. At the portion where the data line pattern 32a of the second mask pattern 32 and third mask patterns 33 are crossed, a TFT (not shown) is formed.

The first mask pattern 31 for a light shielding-layer consists of a body 31a having a predetermined width and a plurality of protrusions 31b. The body 31a is elongated along the data line pattern 32a of the second mask pattern 32 with being overlapped with the portion of the pixel electrode pattern 32b of the second mask pattern 32 for a pixel electrode. The width of the body 31a of the first mask pattern 31 is larger than that of the data line pattern 32a of the second mask pattern 32. Each protrusion 31b of the first mask pattern 31 is protruded from the body 31a to the cross point of the data line pattern 32a of the second mask pattern 32 and the third mask patterns 33.

Figure 4:
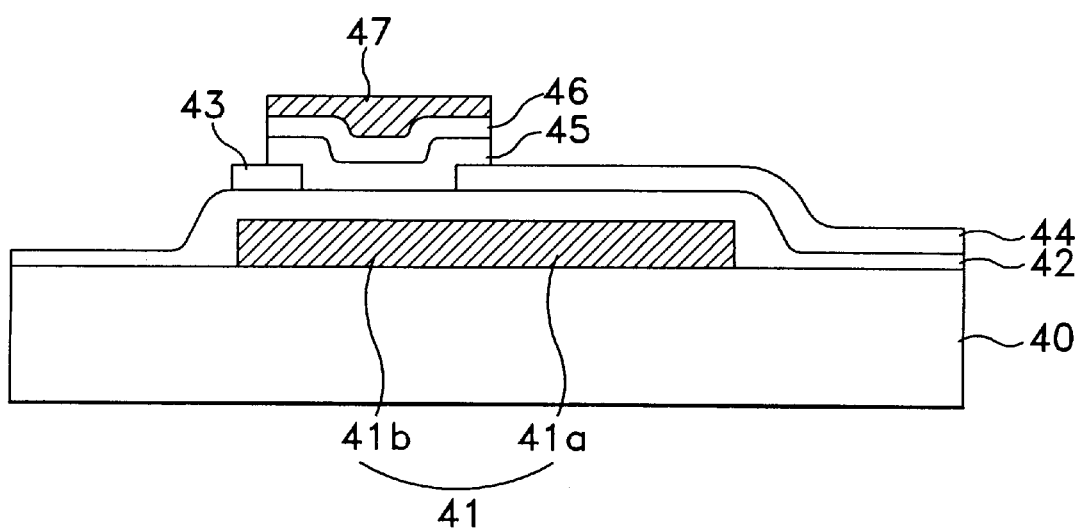
FIG. 4 is a simplified sectional view of a TFT-LCD adapting a storage capacitor which is fabricated by using mask patterns of FIG. 3 in accordance with the present invention.

Referring to FIG. 4, an opaque metal layer, for example Cr or Ta, etc., is formed to a thickness of 800–1000 Å on a transparent insulation substrate 40, for example a glass substrate and then etched by using the first mask pattern 31 of FIG. 3 to form a light-shielding layer 41.

Over the glass substrate 40 including the light-shielding layer 41, an intermediate insulation film 42 such as an silicon oxide film is formed to a thickness of 3500–4500 Å. Over the intermediate insulation film 42, an ITO of a transparent conduction film is formed to a thickness of 800–1000 Å by a sputtering method and then etched by using the second mask pattern 32 to form a data line 43 and a pixel electrode 44. At this time, source/drain electrodes of a TFT(not shown) are formed in the date line and pixel electrode formation step. The source electrode is connected to a data line 43 and the drain electrode is connected to a pixel electrode 44.

Over the glass substrate 40, an amorphous Si layer, an insulation film such as a silicon oxide film, and an Al layer for a gate electrode are formed, in turn to a thickness of 800–1200 Å, 2000–4000 Å, and 3000–5000 Å, respectively and then they are etched by using the third mask pattern 33, in turn to form a semiconductor layer 45, a gate insulation film 46 and a gate line 47, thereby forming a stagger TFT-LCD. At this time, a gate electrode is formed in the gate line formation step and connected to the gate line 47.

According to layout of the TFT-LCD adapting a storage fabricated by using mask patterns of FIG. 3, a plurality of data lines 43 are arranged in parallel over the insulation glass substrate 40 and each data line 43 has a predetermined width. A plurality of gate lines 47 are arranged in parallel over the insulation glass 40 and are crossed with the data lines 43 to define a plurality of pixel regions.

A plurality of the pixel electrodes 44 are formed at the pixel regions, respectively and at the cross points of the data lines 43 and the gate lines 47, a plurality of TFTs are formed and the source/drain electrodes of each TFT are connected to each data line and each pixel electrode, respectively.

A plurality of light-shielding layers 41 made of an opaque layer formed on the insulation glass substrate 40 and each light shielding layer consisting of a body and a plurality of protrusions. The body of each light-shielding layer 41 is elongated along each date line 43 and is overlapped with portions of pixel electrodes 44 and each protrusion 31b is protruded from the body 41 to each TFT.

According to the present invention, a TFT-LCD can be fabricated, that adapts a storage capacitor using three mask patterns in a conventional manner. Accordingly, the present invention can solve the problem of a residual image as well as it can improve yield and reduce fabrication cost with a simplified process.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A liquid crystal display device that includes a storage capacitor having a capacitor electrode for storing voltage applied to a pixel electrode for a constant period of time, comprising:

an insulation substrate;

a plurality of data lines arranged in parallel over said insulation substrate;

a plurality of gate lines arranged in parallel over said insulation substrate, the gate lines being crossed with said data lines to define a plurality of pixel regions;

a plurality of pixel electrodes formed at the pixel regions, respectively;

a plurality of TFTs formed at the cross points of the data lines and the gate lines, each TFT having a source electrode and a drain electrode connected to each data line and each pixel electrode, respectively; and a plurality of opaque layers formed on said insulation substrate, each opaque layer comprising a body and a plurality of protrusions, said body being elongated along each data line and overlapped with portions of the pixel electrodes and each protrusion protruded from the body to each TFT along the gate lines.

2. The liquid crystal display device as claimed as claim 1, wherein said opaque layer comprises of Al.

3. The liquid crystal display device as claimed in claim 1, wherein said body of said opaque layer serves as a capacitor electrode of said storage capacitor.

4. The liquid crystal display device as claimed in claim 1, wherein said protrusions of said opaque layer serves as a light-shielding layer of said TFTs.

5. The liquid crystal display device as claimed in claim 1, wherein said data line comprises the same material comprising said pixel electrode.

6. The liquid crystal display device as claimed in claim 1, wherein said data line comprises a transparent conduction film.

* * * * *

UNITED STATES PATENT AND TRADEMARK OFFICE
CERTIFICATE OF CORRECTION

PATENT NO. : 5,929,501
DATED : July 27, 1999
INVENTOR(S) : Shin et al

It is certified that error appears in the above-identified patent and that said Letters Patent is hereby corrected as shown below:

At col. 2, line 53, please cancel "conventinal" and substitute --conventional-- therefor; and at line 54, please cancel "patter" and substitute --patterns-- therefor.

At col. 4, lines 40-41, please cancel "having a source electrode and a drain electrode" and substitute --being-- therefor.

Signed and Sealed this

Eleventh Day of July, 2000

Attest:

Q. TODD DICKINSON

*Attesting Officer*     *Director of Patents and Trademarks*